March 24, 1936.  N. C. STOREY  2,034,779
TILLING MACHINERY OF THE ROTARY TYPE
Filed Oct. 9, 1933
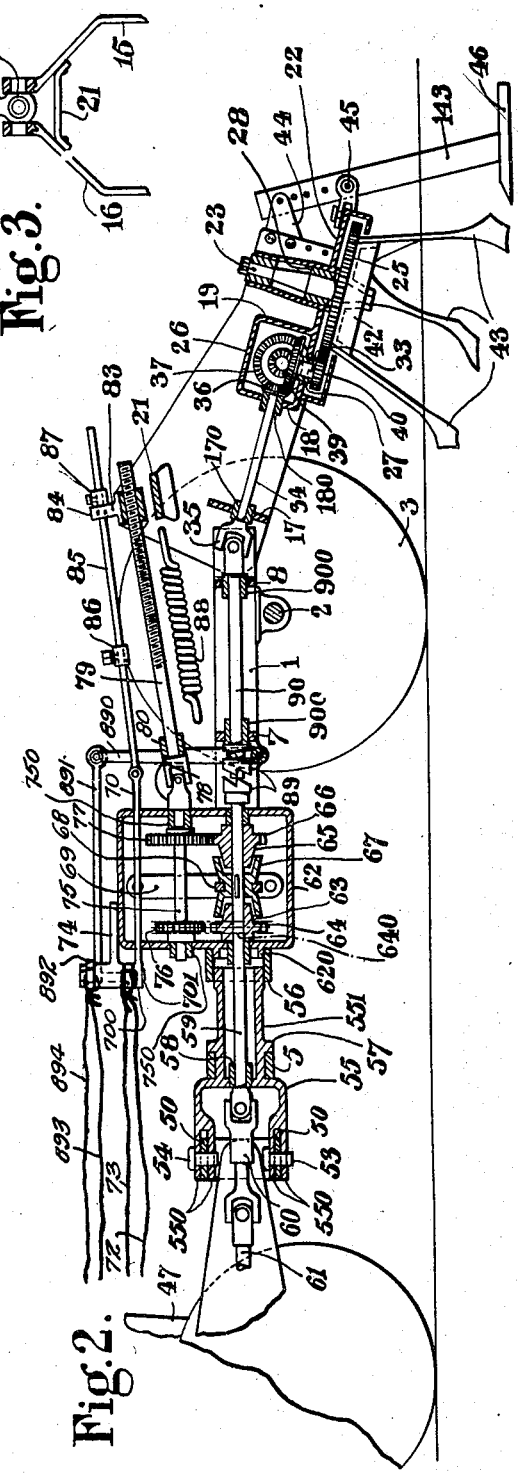
INVENTOR.
NORMAN CHOATE STOREY.
ATTORNEY.

Patented Mar. 24, 1936

2,034,779

UNITED STATES PATENT OFFICE 2,034,779

TILLING MACHINERY OF THE ROTARY TYPE

Norman Choate Storey, Hunslet, Leeds, England

Application October 9, 1933, Serial No. 692,834
In Great Britain February 3, 1933

16 Claims. (Cl. 97—43)

This invention relates to tilling machinery in which rotating tilling instruments are mounted to be driven about axes slightly inclined to the vertical.

The object of the invention is to provide a small low cost tilling attachment comprising tilling implements of the above mentioned type which can be attached to and drawn by a tractor and in which the revolving tillers of the attachment are driven by power derived from the motor of the tractor.

Many of the farms where this type of tilling is desirable are too small and have not enough of this type of tilling to be done to make the self contained tilling machine with its own driving motor a paying proposition, but many of such farms are equipped with tractors for doing various cultivation jobs and an attachment according to the present invention would be a useful adjunct for such tractor.

The invention is illustrated in the accompanying drawing in which:—

Fig. 1 is a plan view of the attachment with certain parts omitted and broken away for clearer illustration.

Fig. 2 is a sectional side elevation taken more or less through a centre line of the attachment.

Fig. 3 is a detail view.

1 is the main frame of the machine which is supported on an axle 2 and land wheels 3, 4. At the forward end of the main frame, the side members are bent inwardly to receive a bearing 5, the frame being tied together by suitable transverse members such as 6, 7 and 8. The rear ends of the main frame side members are provided with jaws 9, 10 which receive the ends 11, 12 of the tiller frame side plates 15, 16, which ends are held in place by pins 13, 14 respectively. The tiller frame comprises the two side plates 15 and 16 which are tied together by transverse members, 17, 18, 19, 20 and 21, the member 21 being best shown in Fig. 3. Under the rear of the tiller frame is a plate 22 which extends forward to the transverse member 18, and to the rear and sides an even distance from the centres of the tiller spindles 23, 24 and just beyond the tiller gears 25. This plate forms the base of a gear case 26 and is provided with two bearings 27, of which only one is shown in Fig. 2. To the rear of the gear case 26 and mounted on the plate 22 are two bearings 28 which are also secured to the side plates 15, 16 and the transverse member 20. Two longitudinal members 30 and 31 in the gear case 26 are provided with bearings 300, 301 respectively to carry a shaft 32 which is shown cut away in Fig. 1 in order to show the position of one of the tiller driving pinions 33. The transverse members 17, 18 are provided with centrally located bearings 170, 180 respectively which carry a shaft 34 hereinafter referred to as the intermediate shaft on the forward end of which is keyed a universal joint 35 and the rear end a bevel pinion 36 which meshes with a bevel gear 37. The shaft 32 is keyed into the bevel gear 37 and is also provided at its ends with bevel pinions 38, only one being shown in Fig. 1. Meshing with pinions 38 are gears 39 (one of which only is shown in Fig. 1) keyed to the upper ends of shafts 40 on which are also keyed pinions 33, which latter mesh with the tiller gears 25. On the lower side of tiller gears 25, rings 42 are provided to which the earth working tools 43 are attached. To the rear of the tiller frame is attached a bar 143 slightly inclined to the vertical to the lower end of which is attached a horizontal underground shoe or runner 46 (Fig. 2). This shoe is pivoted to the plate 22 at 45 and held in adjusted position by a pin or bolt passing through the bracket 44 and one of several holes in the bar 143.

In Fig. 2 the outline of the rear part of a conventional tractor is shown at 47. Extending from the rear of the tractor are two arms 48, 49 best shown in Fig. 1. The rear ends of these arms are provided with jaws 480, 490 respectively to receive a gimble ring 50 which is secured thereto by pins 51, 52 to permit a vertical hinging movement. Secured on the upper and lower sides of ring 50 by pins 53, 54 are jawed ends 550 of a draft connection 55 of the main frame permitting a horizontal swinging movement. The draw bar connection 55 has a tubular rearward extension 551 which is rotatably mounted in bearings 5 and 56 on the main frame 1 and held against longitudinal movement by a collar 57 abutting against the bearing 5 but is permitted to rotate in its bearings thereby permitting a torsional movement between the tractor and the tilling machine. A bearing 58 mounted in the rear wall of the draw bar connection 55 concentric with bearing 5 carries a primary transmission shaft 59 (Fig. 2) having keyed on its forward end a double universal joint 60 which transmits the tractor's motor power from the power take off shaft 61. The tilling tools of the type illustrated operate best at a speed which is much below the lowest speed which can be obtained by an ordinary transmission in a tractor. In this instance, the desired low speed may be obtained either by building in a special low speed transmission or by using an auxiliary transmission of suitable type. The rear end of shaft 59 passes through a gear box 62 carried at its forward end by a spigot 620 engaging in bearing 56 (Fig. 2) and at the rear by side arms 621 secured to the side frames 1 (Fig. 1). The shaft 59 has rotatably mounted on its forward end within the gear box 62 a clutch cone 63 which carries a sprocket 64. On the other end of said shaft and within the gear box 62 is a clutch cone 65 on which is secured a spur gear 66. Between the cones 63 and 65 and splined onto shaft 59, to permit a sliding movement, is the double ended clutch element 67 to cooperate with either one of the clutch cones 63 or 65 and within its centrally located groove, is a shifter fork 68 which is actuated by lever 69 connected to rod 70. On the forward end of rod 70 is an eye 700 fitting over a downward protruding pin 701 carried on the lower face of a double ended lever 71. The lever 71 is pivotally mounted in a bracket 74 bolted to the top of the gear case 62, control ropes 72, 73 being attached to the ends of lever 71, the free ends of said ropes being carried in proximity to the driver's seat.

A shaft 75 carried in bearings 750 in the gear case 62 has keyed to its forward end a sprocket 76 in line with sprocket 64, said sprockets being connected by a chain drive 640. At its rear end said shaft 75 has keyed thereto a gear 77 meshing with gear 66. To the rear of the gear case 62 and keyed to shaft 75 is a universal coupling 78 to which is secured a screw shaft 79 carried in bearing 80 best shown in Fig. 2. The bearing 80 is provided with side trunnion lugs 800 (Fig. 1) on the same centre line as the universal coupling 78, the trunnions having bearings 801 in the frame members 81, 82. The rear end of screw shaft 79 passes through a trunnion nut 83, the trunnions having their bearings in the tiller side frames 15 and 16 (Fig. 3). Extending upwards on trunnion nut 83 is an eye 84 through which passes a rod 85, the forward end of which connects with the rod 70 and on each side of said eye 84 are set collars 86, 87.

On each side of the machine and connecting between the tiller frame and main frame are springs 88 only one being shown in Fig. 2 which act to carry part of the weight of the tiller frame and thus reduce the load on the depth runner 46. At the rear of the gear case 62 and keyed onto the primary transmission shaft 59 is the fixed half of a dog clutch 89 the other half being mounted on the splined end of a secondary transmission shaft 90 which latter shaft 90 is carried in bearings 900 in members 7 and 8, its rear end being keyed into the universal coupling 35.

The clutch 89 is actuated by a lever 890 connected to a rod 891, the forward end of which is connected to a double ended lever 892 pivoted on the bracket 74. Control ropes 893, 894 are attached to the ends of the double ended lever 892, the free ends of said ropes being carried in proximity to the driver's seat.

The drive from the tractor to the tillers is effected as follows:

Power is applied from the tractor shaft 61 through the flexible coupling 60, primary transmission shaft 59, dog clutch 89, secondary transmission shaft 90, universal joint 35, shaft 34 to pinion 36 which drives gear 37, shaft 32 and pinions 38. The pinions 38 mesh with gears 39 which drive pinions 33 through shafts 40 and pinions 33 drive the tiller gears 25, and consequently the tilling implements which are secured to the tiller rings 42 are driven around their axes.

To raise the tiller frame with the earth working tools, the control rope 73 is pulled, actuating lever 71 and forcing rod 70 rearwardly thus engaging clutch element 67 with clutch cone 65 and driving screw shaft 79 through universal joint 78, shaft 75, and gears 66, 77. While thus being driven, the thread on the screw shaft is of the proper hand to screw into trunnion nut 83 and force the tiller frame upwardly about its hinging axis 13, 14. As the tillers are rising, the trunnion nut 83 will be moved along the shaft 79 and its eye 84 will be moved down rod 85 until it comes in contact with the collar clamp 86. Continued movement of the nut then will force clutch element 67 into a neutral position through the actuating lever 69 and rods 70 and 85 to lower the tiller frame, control rope 72 is pulled and clutch element 67 is brought in contact with clutch cone 63 thus giving a reverse motion to the screw shaft 79 through chain drive 640 connecting sprockets 64 and 76. The collar 87 is set so that when the desired depth has been reached by the tillers, the trunnion nut 83 pushes against collar 87 and clutch 67 is neutralized through the intermediate parts.

In tilling some types of soil it is advantageous to drive the tillers in an opposite direction to their usual one, for which purpose the shaft 32 with its pinions 38 and gear 37 is so designed that it can be reversed in its bearings and thus put gear 37 on the other side of the driving pinion 36 thus reversing the direction of rotation of shaft 32 and tillers 43.

Bearing 80 with its trunnion support is provided to transfer the load from the lifting screw to the main frame.

It will be seen that the pins 13 and 14 are coaxial with each other and also with the center of the universal joint 35, so that when the tiller frame is raised or lowered, the driving connection to the tilling tools is not disturbed in any way. Similarly, the pins 53 and 54 are coaxial with each other and also with the center of the universal connection 60, so that the main frame may move freely either horizontally or vertically with respect to the tractor without disturbing the driving connection between the tractor and the mechanism on the main frame.

While I have shown the invention as embodied in a specific form, it is to be understood that various changes in details may be made without departing from the scope of the invention, as defined by the appended claims.

What I claim as my invention and desire to secure by Letters Patent of the United States is:—

1. A rotary tilling attachment for a tractor having a power take-off connection, comprising a main frame mounted on land wheels, a flexible connection for connecting said attachment to the tractor, a vertically swingable frame suspended from the rear of the main frame, rotatory earth working implements mounted on said vertically swingable frame, a primary transmission shaft mounted on said main frame, means for driving said primary transmission shaft from the tractor power take-off connection, a secondary transmission shaft mounted on said main frame, clutch means interposed between said primary and secondary transmission shafts, an intermediate shaft carried by said vertically swingable frame, a flexible coupling connecting said intermediate shaft to the secondary transmission shaft, gearing adapted to be driven by said intermediate shaft for driving the earth working implements and power driven means operated from one of said transmission shafts for lifting or lowering said vertically swingable frame.

2. A rotary tilling attachment for a tractor having a power take-off connection, comprising a main frame mounted on land wheels, a flexible connection for connecting said attachment to the tractor, a vertically swingable frame suspended from the rear of the main frame, rotatory earth working implements mounted on said vertically swingable frame, a primary transmission shaft mounted on said main frame, means for driving said primary transmission shaft from the tractor power take-off connection, a secondary transmission shaft mounted on said main frame, clutch means interposed between said primary and secondary transmission shafts, an intermediate shaft carried by said vertically swingable frame, a flexible coupling connecting said intermediate shaft to the secondary transmission shaft, gearing adapted to be driven by said intermediate shaft for driving the earth working implements and means including a controllable connection to said primary transmission shaft for lifting or lowering said vertically swingable frame.

3. A rotary tilling attachment for a tractor having a power take-off connection, comprising a main frame mounted on land wheels, a flexible connection for connecting said attachment to the tractor, a vertically swingable frame suspended from the rear of the main frame, rotatory earth working implements mounted on said vertically swingable frame, a primary transmission shaft mounted on said main frame, means for driving said primary transmission shaft from the tractor power take-off connection, a secondary transmission shaft mounted on said main frame, clutch means interposed between said primary and secondary transmission shafts, an intermediate shaft carried by said vertically swingable frame, a flexible coupling connecting said intermediate shaft to the secondary transmission shaft, gearing adapted to be driven by said intermediate shaft for driving the earth working implements, power driven means for lifting or lowering said vertically swingable frame including clutches interposed on said primary transmission shaft, one of which is adapted to transmit power to lift the vertically swingable frame and the other to lower said frame, and means for controlling said clutches.

4. A rotary tilling attachment for a tractor having a power take-off connection, comprising a main frame mounted on land wheels, a flexible connection for connecting said attachment to the tractor, a vertically swingable frame suspended from the rear of the main frame, rotatory earth working implements mounted on said vertically swingable frame, a primary transmission shaft mounted on said main frame, means for driving said primary transmission shaft from the tractor power take-off connection, a secondary transmission shaft mounted on said main frame, clutch means interposed between said primary and secondary transmission shafts, an intermediate shaft carried by said vertically swingable frame, a flexible coupling connecting said intermediate shaft to the secondary transmission shaft, gearing adapted to be driven by said intermediate shaft for driving the earth working implements, power driven means for lifting or lowering said vertically swingable frame and means for automatically stopping the lifting or lowering means when the desired height or depth has been attained.

5. A rotary tilling attachment for a tractor having a power take-off connection, comprising a main frame mounted on land wheels, a flexible connection for connecting said attachment to the tractor, a vertically swingable frame suspended from the rear of the main frame, rotatory earth working implements mounted on said vertically swingable frame, a primary transmission shaft mounted on said main frame, means for driving said primary transmission shaft from the tractor power take-off connection, a secondary transmission shaft mounted on said main frame, clutch means interposed between said primary and secondary transmission shafts, an intermediate shaft carried by said vertically swingable frame, a flexible coupling connecting said intermediate shaft to the secondary transmission shaft, gearing adapted to be driven by said intermediate shaft for driving the earth working implements, power driven means for lifting or lowering said vertically swingable frame including clutches interposed on said primary transmission shaft, one of which is adapted to transmit power to lift the vertically swingable frame and the other to lower said frame, means for controlling said clutches and means automatically disconnecting said clutches when the desired height or depth has been attained.

6. A rotary tilling attachment for a tractor having a power take-off connection, comprising a main frame mounted on land wheels, a flexible connection for connecting said attachment to the tractor, a vertically swingable frame suspended from the rear of the main frame, rotatory earth working implements mounted on said vertically swingable frame, a primary transmission shaft mounted on said main frame, means for driving said primary transmission shaft from the tractor power take-off connection, a secondary transmission shaft mounted on said main frame, clutch means interposed between said primary and secondary transmission shafts, an intermediate shaft carried by said vertically swingable frame, a flexible coupling connecting said intermediate shaft to the secondary transmission shaft, gearing adapted to be set and to be driven by said intermediate shaft for driving the earth working implements in the one or the other direction and means for lifting or lowering said vertically swingable frame.

7. In combination, a tractor power take-off, a tilling attachment having a main frame mounted upon land wheels, means to connect said frame to a tractor to be propelled thereby, a tiller frame secured to said main frame on a horizontally extending pivot, tilling tools rotatably mounted on said tiller frame, a connection between said take-off and tools to operate said tools from said take-off, means to raise and lower said tiller frame on its pivot while said connection is maintained, and means to actuate said raising and lowering means from said take-off.

8. In combination, a tractor power take-off, a tilling attachment having a main frame mounted upon land wheels, means to connect said frame to a tractor to be propelled thereby, a tiller frame secured to said main frame on a horizontally extending pivot, tilling tools rotatably mounted on said tiller frame, a connection between said take-off and tools to operate said tools from said take-off, means to raise and lower said tiller frame on its pivot while said connection is maintained, means to actuate said raising and lowering means from said take-off, and means to automatically render said actuating means inoperative when the tiller frame has been raised or lowered to the desired position.

9. In combination, a tractor power take-off, a tilling attachment having a main frame mounted upon land wheels, means to connect said frame to a tractor to be propelled thereby, a tiller frame secured to said main frame on a horizontally extending pivot, tilling tools rotatably mounted on said tiller frame, a connection between said take-off and tools to operate said tools from said take-off, means to raise and lower said tiller frame on its pivot while said connection is maintained, means to actuate said raising and lowering means from said take-off, and means to automatically render said actuating means inoperative when the tiller frame has been raised to the desired position.

10. In combination, a tractor power take-off, a tilling attachment having a main frame mounted upon land wheels, means to connect said frame to a tractor to be propelled thereby, a tiller frame secured to said main frame on a horizontally extending pivot, tilling tools rotatably mounted on said tiller frame, a connection between said take-off and tools to operate said tools from said take-off, means to raise and lower said tiller frame on its pivot while said connection is maintained, means to actuate said raising and lowering means from said take-off, and means to automatically render said actuating means inoperative when the tiller frame has been lowered to the desired position.

11. In combination, a tractor power take-off, a tilling attachment having a main frame mounted upon land wheels, means to connect said frame to a tractor to be propelled thereby, a tiller frame secured to said main frame on a horizontally extending pivot, tilling tools rotatably mounted on said tiller frame, means to operate said tools from said take-off, a connection between said take-off and said tiller frame and including two clutches, one adapted to raise and the other to lower the tiller frame by movement on its pivot, and means to render either one of said clutches operative.

12. In combination, a tractor power take-off, a tilling attachment having a main frame mounted upon land wheels, means to connect said frame to a tractor to be propelled thereby, a tiller frame secured to said main frame on a horizontally extending pivot, tilling tools rotatably mounted on said tiller frame, means to operate said tools from said take-off, a connection between said take-off and said tiller frame and including two clutches, one adapted to raise and the other to lower the tiller frame by movement on its pivot, means to render either one of said clutches operative, and means to automatically disconnect either clutch when the tiller frame has reached the desired position.

13. In combination, a tractor power take-off, a tilling attachment having a main frame mounted upon land wheels, means to connect said frame to a tractor to be propelled thereby, a tiller frame secured to said main frame on a horizontally extending pivot, tilling tools rotatably mounted on said tiller frame, means to operate said tools from said take-off, means to raise and lower said tiller frame on its pivot, and means to actuate said raising and lowering means from said take-off.

14. In combination, a tractor power take-off, a tilling attachment having a main frame mounted upon land wheels, means to connect said frame to a tractor to be propelled thereby, a tiller frame secured to said main frame on a horizontally extending pivot, tilling tools rotatably mounted on said tiller frame, means to operate said tools from said take-off, means to raise and lower said tiller frame on its pivot, means to actuate said raising and lowering means from said take-off, and means to automatically render said actuating means inoperative when the tiller frame has been raised or lowered to the desired position.

15. In combination, a tractor power take-off, a tilling attachment having a main frame mounted upon land wheels, means to connect said frame to a tractor to be propelled thereby, a tiller frame secured to said main frame on a horizontally extending pivot, tilling tools rotatably mounted on said tiller frame, means to operate said tools from said take-off, means to raise and lower said tiller frame on its pivot, means to actuate said raising and lowering means from said take-off, and means to automatically render said actuating means inoperative when the tiller frame has been raised to the desired position.

16. In combination, a tractor power take-off, a tilling attachment having a main frame mounted upon land wheels, means to connect said frame to a tractor to be propelled thereby, a tiller frame secured to said main frame on a horizontally extending pivot, tilling tools rotatably mounted on said tiller frame, means to operate said tools from said take-off, means to raise and lower said tiller frame on its pivot, means to actuate said raising and lowering means from said take-off, and means to automatically render said actuating means inoperative when the tiller frame has been lowered to the desired position.

NORMAN CHOATE STOREY.